Figure 1:
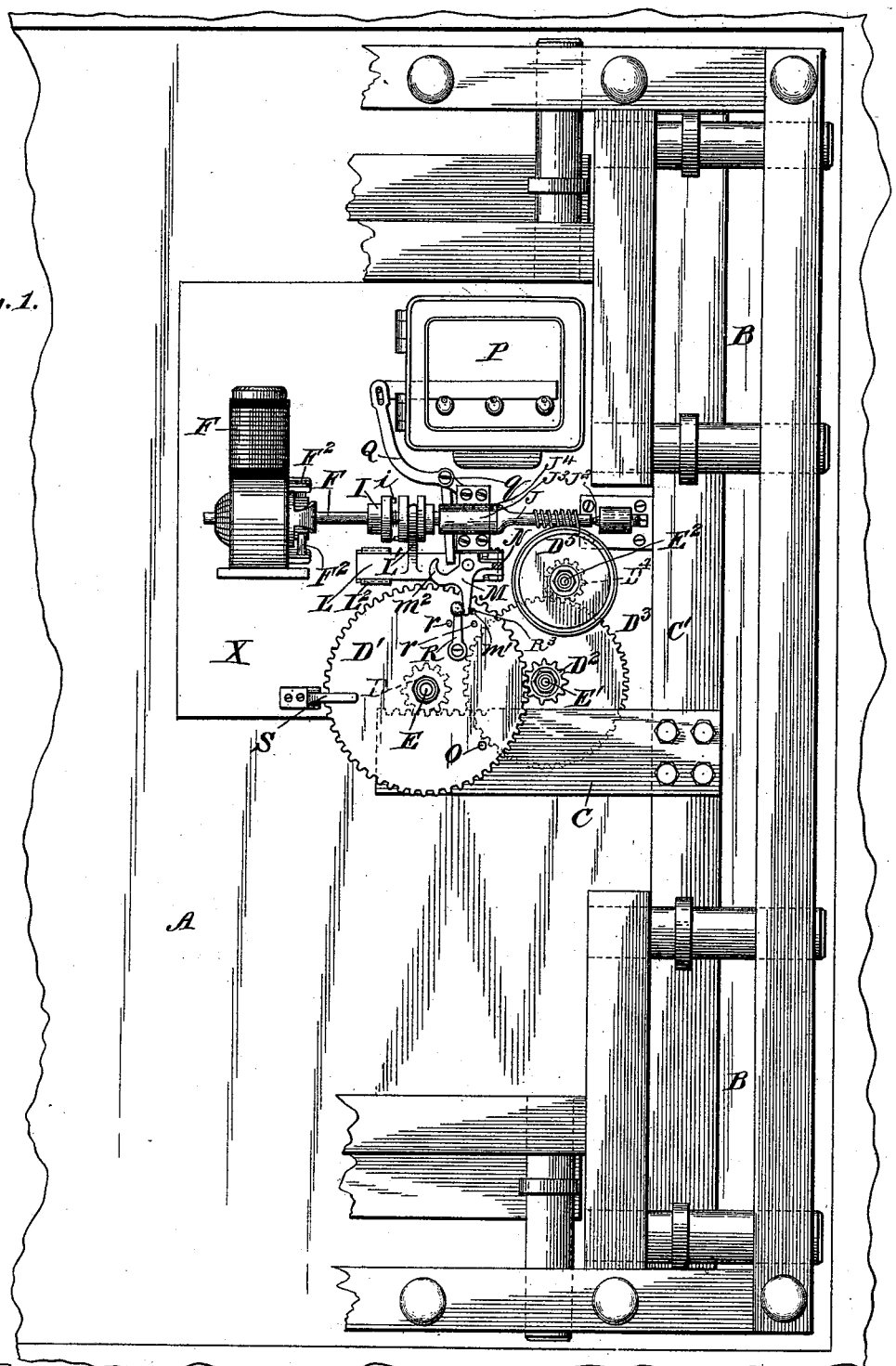

(No Model.) 6 Sheets—Sheet 1.

E. & H. C. STOCKWELL.
ELECTRIC BOLT OPERATING MECHANISM FOR SAFES.

No. 494,495. Patented Mar. 28, 1893.

Witnesses:
Harry S. Rohrer
Wm. E. Knight

Inventors:
Emory Stockwell
Herbert C. Stockwell
By Knight Bros.
Attorneys (No Model.)

E. & H. C. STOCKWELL.
ELECTRIC BOLT OPERATING MECHANISM FOR SAFES.

No. 494,495.

6 Sheets—Sheet 2.

Patented Mar. 28, 1893.

(No Model.) 6 Sheets—Sheet 3.
E. & H. C. STOCKWELL.
ELECTRIC BOLT OPERATING MECHANISM FOR SAFES.
No. 494,495. Patented Mar. 28, 1893.

Witnesses:
Harry S. Rohrer.
Wm. E. Knight.

Inventors
Emory Stockwell
Herbert C. Stockwell
By Knight Bros.
Attorneys.

(No Model.) 6 Sheets—Sheet 4.
E. & H. C. STOCKWELL.
ELECTRIC BOLT OPERATING MECHANISM FOR SAFES.

No. 494,495. Patented Mar. 28, 1893.

Witnesses:
Harry S. Rohrer.
Wm. E. Knight.

Inventors
Emory Stockwell
Herbert C. Stockwell
By Knight Bros
Attorneys.

(No Model.) 6 Sheets—Sheet 5.
E. & H. C. STOCKWELL.
ELECTRIC BOLT OPERATING MECHANISM FOR SAFES.
No. 494,495. Patented Mar. 28, 1893.
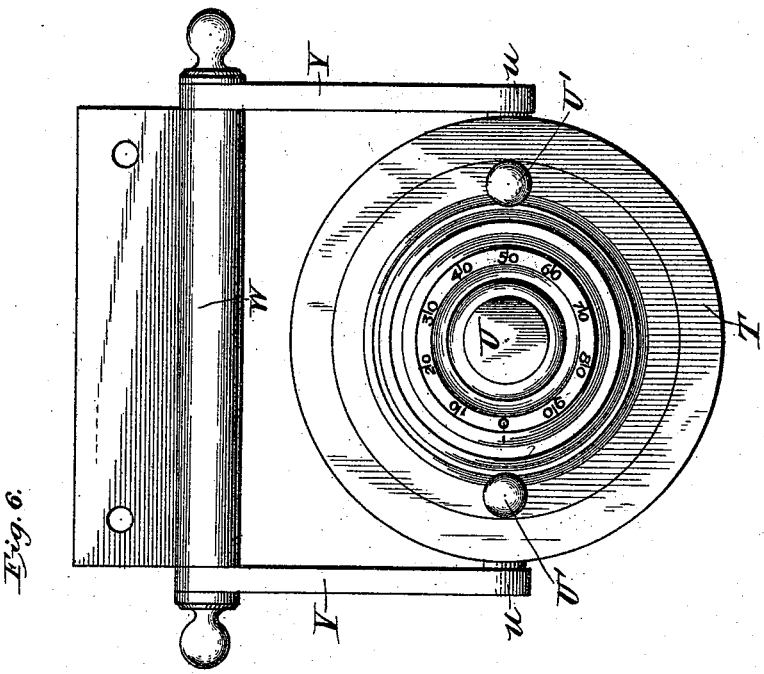
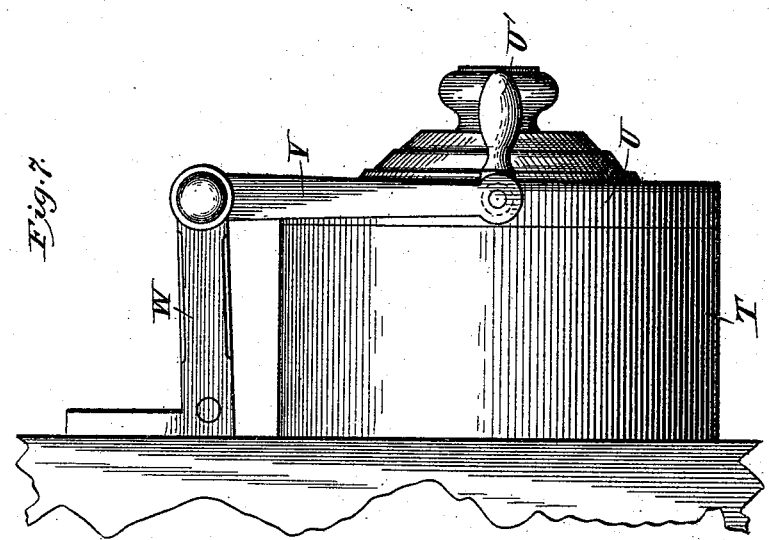

(No Model.) 6 Sheets—Sheet 6.
E. & H. C. STOCKWELL.
ELECTRIC BOLT OPERATING MECHANISM FOR SAFES.
No. 494,495. Patented Mar. 28, 1893.

Witnesses:
Harry S. Ashmu
Wm E. Knight

Inventors:
Emory Stockwell.
Herbert C. Stockwell.
By Knight Bros.
Attorneys.

THE NORRIS PETERS CO., PHOTO-LITHO., WASHINGTON, D. C.

UNITED STATES PATENT OFFICE.

EMORY STOCKWELL AND HERBERT C. STOCKWELL, OF STAMFORD, CONNECTICUT, ASSIGNORS TO THE YALE & TOWNE MANUFACTURING COMPANY, OF SAME PLACE.

ELECTRIC BOLT-OPERATING MECHANISM FOR SAFES.

SPECIFICATION forming part of Letters Patent No. 494,495, dated March 28, 1893.

Application filed July 11, 1892. Serial No. 439,644. (No model.)

*To all whom it may concern:*

Be it known that we, EMORY STOCKWELL and HERBERT C. STOCKWELL, both citizens of the United States, residing at Stamford, in the county of Fairfield and State of Connecticut, have invented certain new and useful Improvements in Electric Bolt-Operating Mechanism for Safes, of which the following specification, taken in connection with the accompanying drawings, is a full, clear, and exact description, such as will enable those skilled in the art to make and use the same.

Heretofore, the bolts of safes have been commonly thrown by the use of weights or springs under the control of various forms of mechanism, but their action is so sudden as to jar the mechanism of the bolt work and cause trouble unless it is properly cushioned. It has also been proposed to operate the bolt-work by means of an electro-magnetic step-by-step mechanism; or to employ such a mechanism as supplementary or auxiliary to a time-lock, so that in case the time movements fail to complete their work, the electrical device gradually runs down the unlocking mechanism of the time-lock to allow the dog to fall.

Our invention consists broadly of a reversible electric motor connected by a suitable train of gearing to the bolt-work of a safe, suitable mechanism for automatically disengaging the motor from the bolt-work, and a time-lock for throwing the motor into engagement again at a pre-determined time. When the motor is revolved in one direction the bolt-work will be thrown into locked position and automatically disengaged from the motor. The bolt-work remains in locked position disengaged from the motor until the operation of the time-lock to throw the motor into gear again. Then by revolving the motor in the opposite direction the bolt-work is thrown into unlocked position and the motor again automatically disengaged.

The specific embodiment of the invention illustrated in the drawings, consists of an electric motor supported by suitable brackets on the inside of the safe door and having a sectional armature shaft which is supported in suitable journals and provided with an automatic clutch for placing the two sections of the shaft into engagement. The clutch is held out of engaged position by means of a small spiral spring, and thrown into engaged position by a sliding bolt engaging one member of the clutch. One section of the armature shaft is formed with a worm which engages a worm wheel of a train of gears, the last wheel of which gear is provided with a small pinion which engages a rack bar connected with the bolt-work for throwing it in and out. The sliding clutch-actuating bolt is provided with a pivoted spring latch which holds the clutch normally in position and which is automatically disengaged from its retaining stop by means of a pin on one of the gear wheels to allow the clutch shifting spring to throw the motor out of gear at the completion of the movement of the bolt-work into locked or unlocked position. A time lock adapted to be set for any pre-determined time, actuates a lever of peculiar shape for shifting the clutch-bolt and throwing the clutch into engagement; when by completing the circuit, the motor can be rotated and the bolt-work operated.

The battery for supplying the electric current to the motor can be either inside or outside of the safe and the wires forming connections between the motor battery and circuit closer on the outside are passed through zig-zag passages in the wall or door of the safe so as not to materially weaken it.

As auxiliary to the invention, a burglar proof housing is employed for inclosing and protecting the circuit closer, which preferably consists of a cylindrical housing attached to the safe door and provided in its front with a rotatable screw-door, locked by a combination lock; whereby the motor cannot be actuated for unlocking the safe even at the predetermined time, unless the operator knows the combination to the chamber in which the circuit closer is situated.

In order that our invention may be fully understood we will now proceed to describe its distinctive features with particular reference to the accompanying drawings, in which:—

Figure 2:
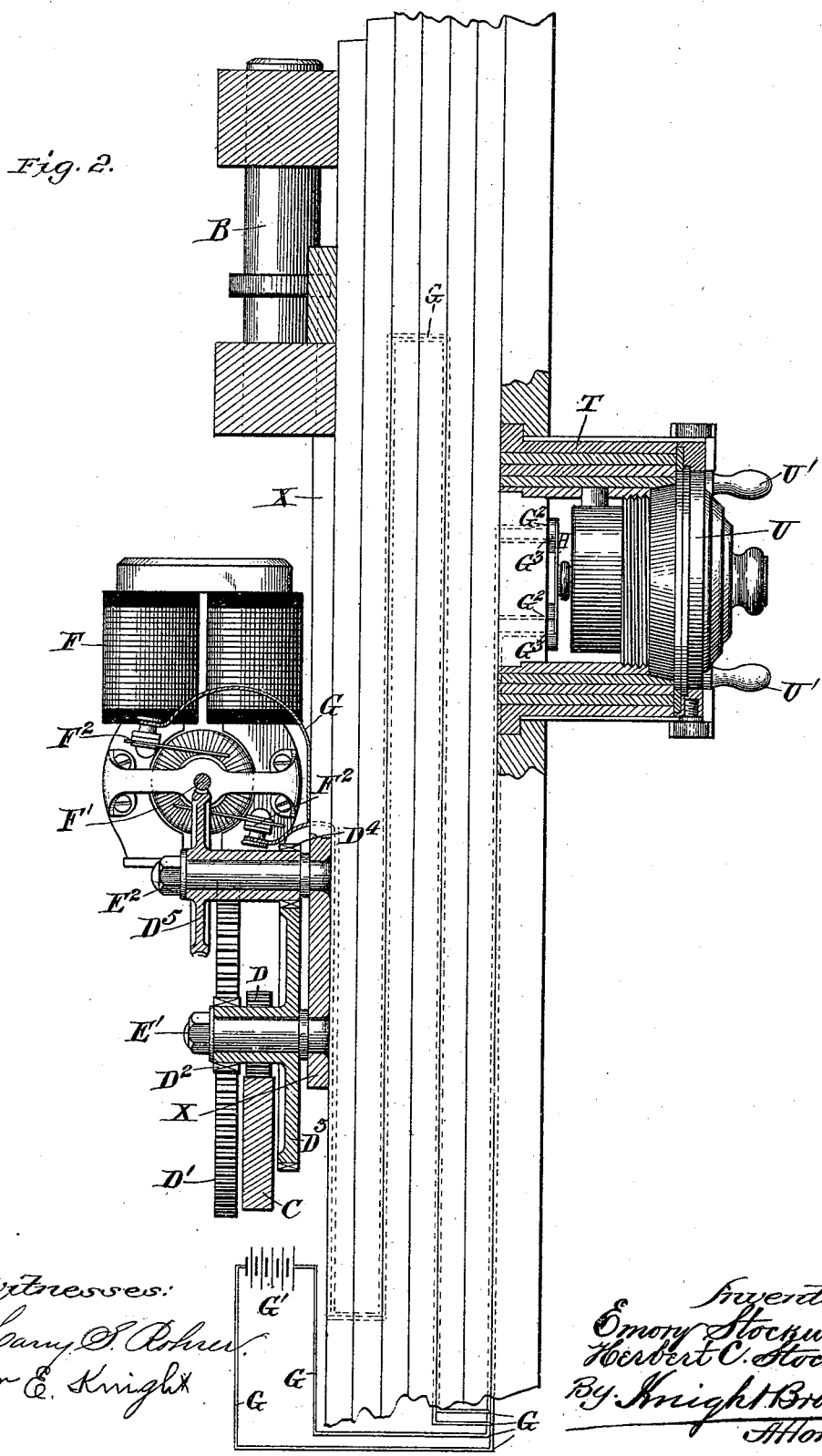
Figure 3:
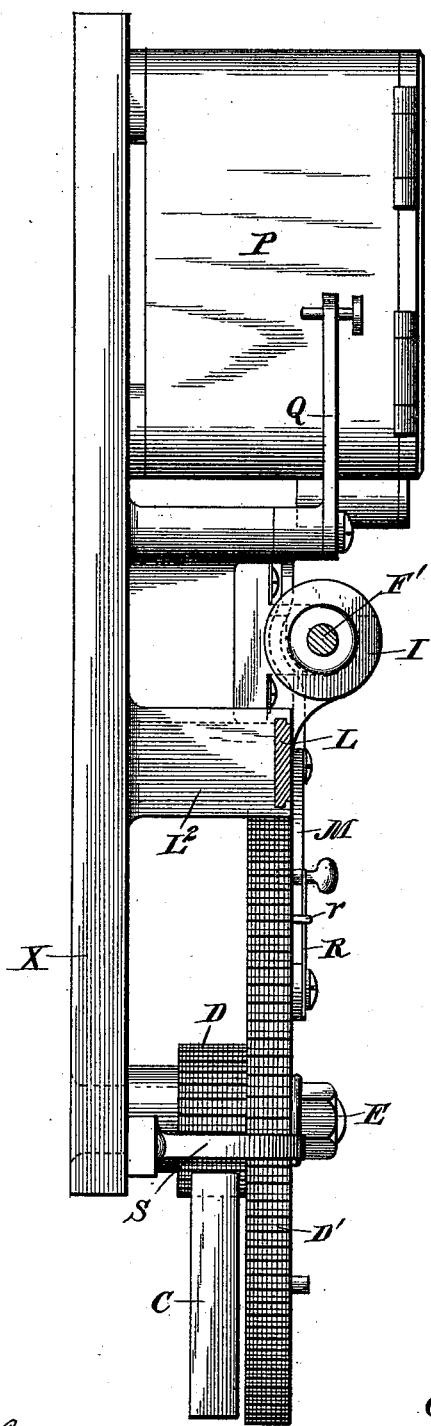
Figure 4:
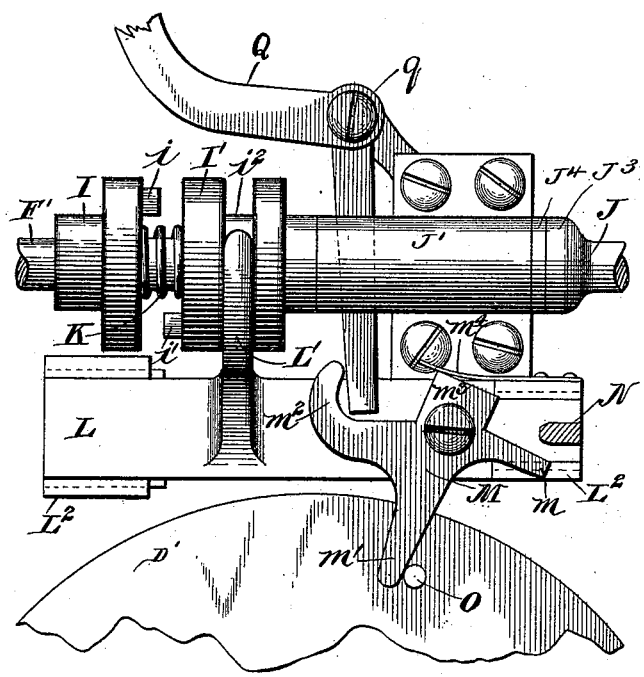
Figure 5:
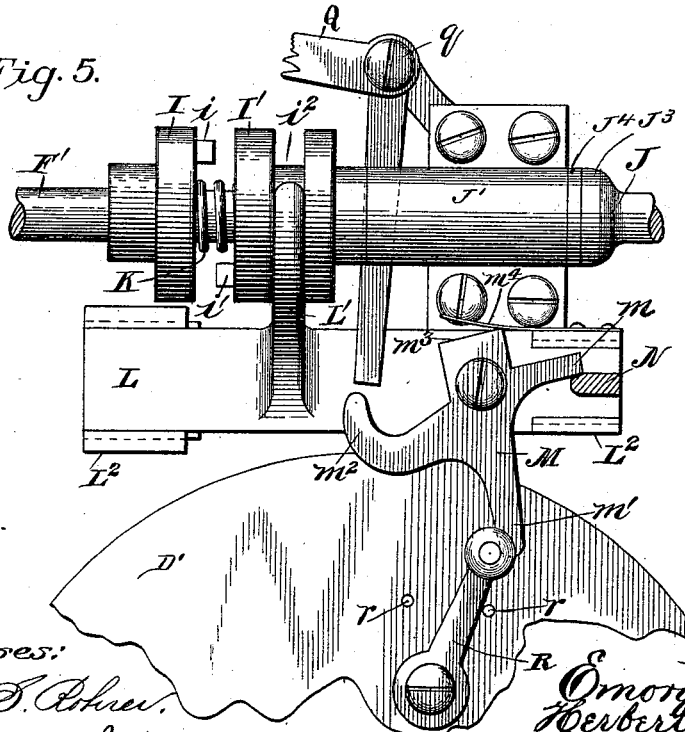
Figure 8:
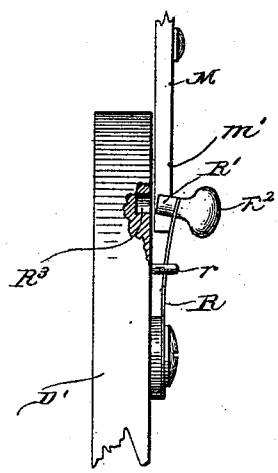
Figure 9:
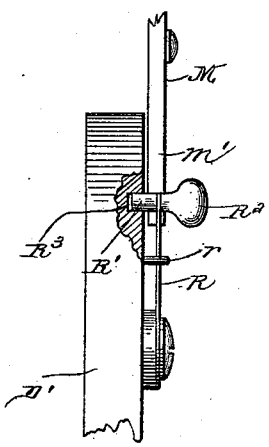
Figure 10:
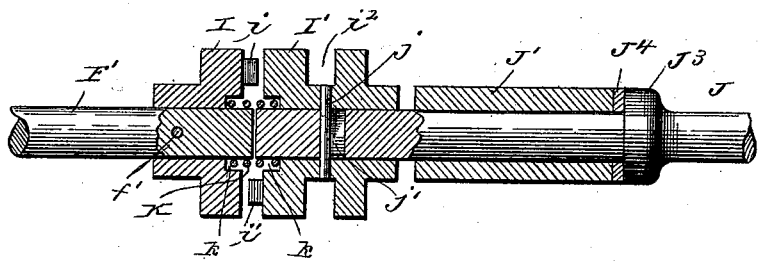

Figure 1 is a detail inside elevation of a portion of a safe-door representing our improvements applied to the bolt-work. Fig. 2 is an enlarged detail edge view of a portion of the same, part being shown in section. Fig. 3 is an enlarged detail side elevation of part of the operating mechanism, the motor shaft being shown in section. Figs. 4 and 5 are enlarged detail views representing the operation of the clutch-shifting mechanism. Figs. 6 and 7 are respectively a top view and side elevation of the burglar proof housing which incloses the circuit closing device. Figs. 8 and 9 are detail views representing the pivoted arm which operates the clutch bolt. Fig. 10 is a sectional view of a portion of the motor shaft and clutch.

In Figs. 1, 2 and 3 the mechanism is shown in unlocked position in readiness for throwing the bolts in locked position.

A is the safe-door and B represents any approved form of bolt-work applied thereto in the usual manner.

C is a rack-bar rigidly attached to and extending from the bolt-operating rod C', and gearing with a small pinion D formed integral with a large gear-wheel D' and rotatably supported on a journal-pin E projecting from the supporting plate X.

$D^2$ is a small pinion gearing with the wheel D' and formed integral with the large pinion $D^3$ which in turn gears with the small pinion $D^4$. The small pinion $D^4$ is formed integral with a worm wheel $D^5$; the pinions $D^2$ and $D^3$ being rotatably supported on the journal-pin E', and the pinion $D^4$ and worm-wheel $D^5$ being rotatably supported on the journal-pin $E^2$. The gear-wheels D, D', $D^2$, $D^3$, $D^4$, and $D^5$ make up the train of gearing for transmitting motion from the motor shaft to the bolt work.

F is any form of reversible electric motor supported in convenient position on the inside of the safe-door, and provided with the armature shaft F' which is supported as usual and provided with the armature and commutator.

$F^2$ are the brushes and G are the wires for supplying the electric current from the battery G'. The wires G pass through zig-zag passages formed through the wall or door of the safe, and are attached at the outside to the terminal contact points $G^2$ and $G^3$ of the circuit closer H.

I is one section of a clutch keyed to the end of the armature shaft F' by means of a pin f' and formed with the clutch tooth i on its face.

J is a section of armature shaft supported by suitable bearings J' and $J^2$ in line with the shaft F' and having at its inner end the movable member I' of the clutch keyed to it by means of a pin j secured to the clutch section and passing through an elongated opening j' so that the clutch section can move longitudinally on the shaft. The shaft J is formed with an integral collar $J^3$ which bears against a washer $J^4$ supported on the shaft J against the bearing J'. The movable member I' of the clutch is formed with the clutch tooth i' which is adapted to engage with the tooth i of the other member I of the clutch, so that the shaft J will revolve with the shaft F. The inner face of each of the clutch members I, I' is formed with an annular recess k in which is seated a small spiral spring K which is adapted to force the movable member of the clutch out of engagement with the fixed member, when unrestrained.

L is a sliding bolt dove-tailed into the upper ends of the supports $L^2$, and provided with a curved projecting arm L' which engages the annular groove $i^2$ of the movable clutch member I' for moving it into engagement with the fixed member.

M is a catch or latch pivoted to the bolt L and formed with a stop-nose m which is adapted to engage a stationary lug or stop N for holding the bolt in engaged position, and two operating arms m' and $m^2$ which are respectively engaged by the mechanism hereinafter described for releasing and engaging the clutch.

$m^3$ is a flat or squared face against which bears a leaf spring $m^4$ extending from one of the supports $L^2$ for retaining the latch M in its normal engaged position.

With the mechanism described it will be observed that the bolt-work can be easily thrown into locked and unlocked position by simply revolving the motor in opposite directions. It is clear, however, that when the bolt-work is fully thrown in either direction, the motor should be disconnected, as otherwise, its continued revolution would cause injury to the mechanism. To effect this result we have devised means for automatically disengaging the clutch at the completion of the movement of the bolt-work in either direction.

At a proper point on the gear wheel D' a pin O is placed, so that when the bolt-work shall be fully locked this pin will impinge against the arm m' of the latch M and shift it to the position shown in Fig. 4, and allow the spiral spring K to shift the movable member of the clutch and disengage the motor from the train of gearing. The parts will safely remain in this position and allow the motor to continue its revolution without harm as long as the current remains on.

In combination with the above mechanism for operating the bolt-work, we provide a suitable time-lock for re-establishing the connection between the sectional armature shaft at a certain pre-determined hour, so that after the bolts have been moved into locked position they cannot be retracted, even by the operation of the motor, until the arrival of the hour set.

P is any suitable time-lock, such for instance as the Yale triple time lock, and Q is a lever actuated by said time lock, pivotally supported at q and adapted to engage the hook arm $m^2$ of the latch M and gradually move the clutch shifting bolt L and clutch member I' against the action of the spring K, until the nose m of the latch M springs into engagement with the stop N and the clutch is again in gear. When the armature shaft is again revolved the clutch members will engage and the bolt-work operate as before. When the bolt-work is withdrawn by the reverse movement of the motor, an arm R pivoted at the proper place on the gear wheel D' engages the arm m' of the latch M as indicated in Fig. 5, and again disengages the latch and automatically throws the motor out of gear as before. The arm R is confined in its movement by pins r, r. The arm R is formed of spring metal and is provided with a pin R' projecting inwardly from its outer end and a knob R² projecting outwardly therefrom. The pin R' is adapted to engage in the hole R³ formed in the gear wheel D' when the arm R is in the position shown in Figs. 5 and 9 in order to give the arm a bearing so it can shift the latch M. Now before the motor can throw the bolt-work forward into locked position, it is necessary to lift the pin R' of the arm R out of engagement with the hole R³ and shift the arm R to the left until it comes in contact with the pin r, when the bolt L can be moved to the left until the latch M springs into place behind the stop N and the clutch is forced into engagement. Then the parts will again be ready for moving the bolt-work into locked position.

S is a bracket or stop extending up from the plate X. When the gear wheel D' revolves to the left for throwing the bolt-work into locked position, the arm R will impinge against the stop S and be moved to the right until the pin R' on its underside is forced into engagement with the hole R³. The arm R will then be in position to disengage the latch M from the stop N at the completion of the unlocking movement as already explained. Two of the wires G pass from the motor F to the two contact points G², and two pass from the battery G', to the two contact points G³, as in the ordinary arrangement of wires in a circuit closing device. The circuit closer H is provided with two contact plates as usual and is adapted to send the current through the motor in either direction for reversing its direction of revolution.

It is clear that with the above described mechanism, the safe cannot be unlocked until the arrival of the time set when the revolution of the motor in the proper direction will withdraw the bolt-work. In order to make the arrangement even more secure, we provide a burglar proof housing T extending from the wall of the safe-door and inclosing the circuit closing device. This may be of any preferred construction, but it is shown in the drawings as consisting of a cylindrical casing having a screw-door U locked by a combination lock of any approved construction. The cover is formed with suitable operating knobs U' and is journaled at u to hinged supporting arms V which are hinged to a projecting frame piece W secured to the wall of the safe-door. By this arrangement the cover, when unlocked is thrown out of the way until it is again desired to lock the chamber.

We illustrate this one embodiment of our invention but wish it understood that we do not limit ourselves thereto, as the particular mechanism employed is immaterial.

Having thus fully described our invention, the following is what we claim as new therein and desire to secure by Letters Patent—

1. A bolt-operating mechanism for safes, comprising suitable bolt-work which is cast and retracted by an electric motor suitably geared thereto, means for automatically throwing the bolt-work out of gear when it is cast, and a time-lock for throwing the motor into gear at the proper time, substantially as set forth.

2. A bolt-operating mechanism for safes, comprising suitable bolt-work which is cast and retracted by an electric motor suitably geared thereto, an automatically disengaging clutch for throwing the bolt-work out of gear when it is cast, and a time-lock for shifting the clutch into gear at a pre-determined time, substantially as set forth.

3. In an electrical bolt-operating mechanism for safes, the combination of a suitable bolt-work a train of gear engaging the bolt-work, a reversible electric motor geared to the train of gear and adapted to cast and retract the bolt-work, means for automatically disengaging the train of gear from the motor when the bolt-work is cast, and a time-lock for throwing the motor into engagement at a pre-determined time, substantially as set forth.

4. In an electrical bolt-operating mechanism for safes, the combination of suitable bolt-work, a train of gearing for operating the bolt-work, an electric motor, an automatic clutch gearing the armature shaft of the motor to the train of gearing, means carried by one of the gear of the train for disengaging the clutch, and a time-lock for throwing the clutch into gear at a pre-determined time, substantially as set forth.

5. In an electrical bolt-operating mechanism for safes, the combination of suitable bolt-work, a train of gearing for operating the bolt-work, an electric motor, an automatic clutch gearing the armature shaft of the motor to the train of gearing, a spring for throwing the clutch out of gear, a device for retaining the clutch in gear, means carried by one of the gearwheels for engaging said clutch-retaining device and allowing the clutch to be moved out of engagement by its spring, and a time-lock for throwing the clutch into gear at a pre-determined time, substantially as set forth.

6. In an electric bolt-operating mechanism for safes, the combination of suitable bolt-work, a rack-bar extending from the bolt-work, a pinion engaging the rack-bar, a train of gearing geared to said pinion, a reversible electric motor, an automatic clutch gearing the armature shaft to the train of gearing, a device for retaining said clutch in engaged position, means for disengaging the clutch, and a time-lock adapted to shift the clutch into engaged position, substantially as set forth.

7. In an electrical bolt-operating mechanism for safes, the combination of suitable bolt-work, and an electric motor geared thereto; with electric supply wires extending through the wall or door of the safe, a battery, a suitable circuit-closing device, and a burglar proof housing extending from the wall of the safe and inclosing the circuit closer, substantially as set forth.

EMORY STOCKWELL.
HERBERT C. STOCKWELL.

Witnesses:
SCHUYLER MERRITT,
GEO. E. WHITE.